Feb. 1, 1949.  H. P. PHILLIPS  2,460,430
INNER RING OR EXPANDER FOR PISTONS
Filed April 26, 1944
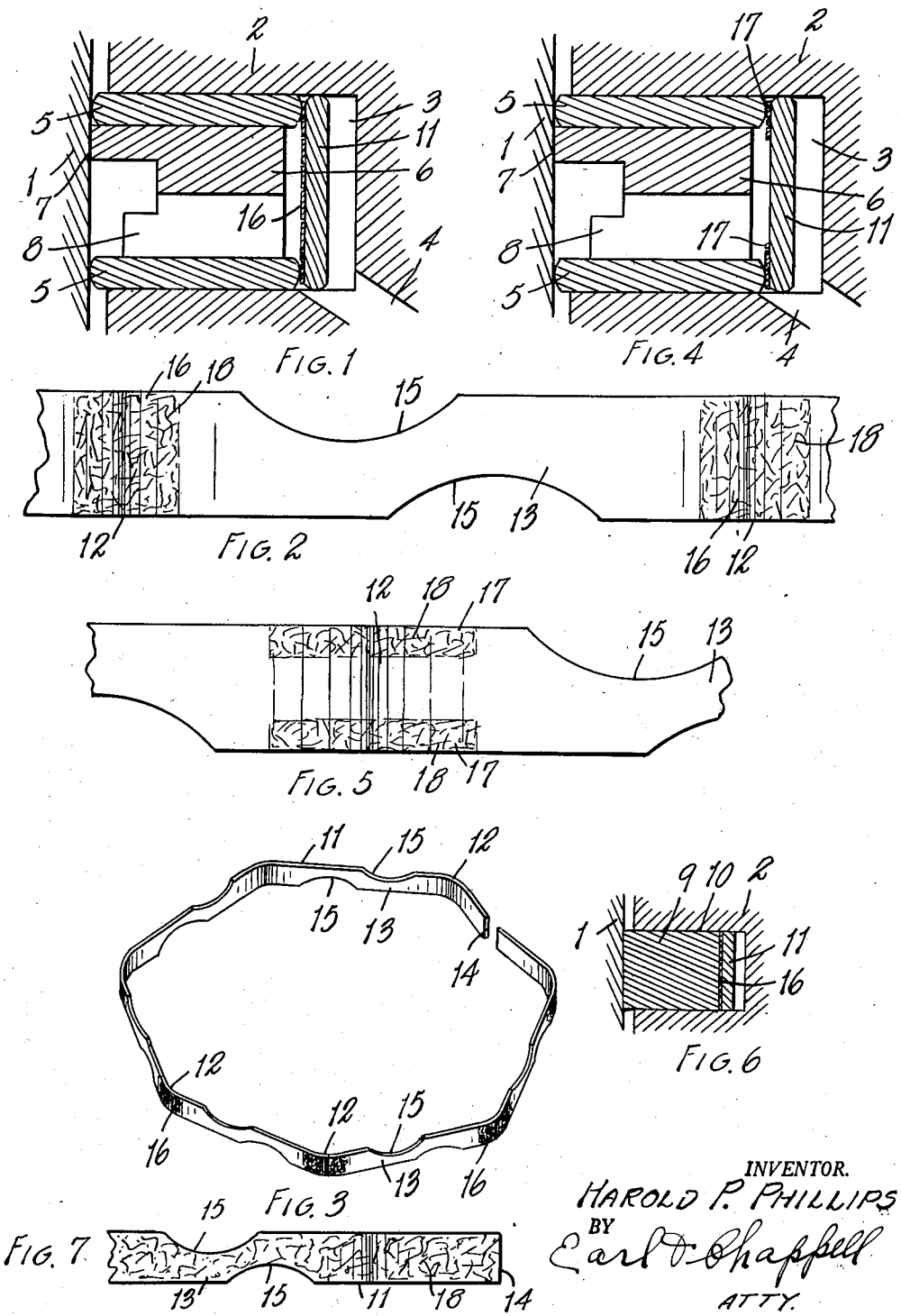
INVENTOR.
HAROLD P. PHILLIPS
BY
Earl D. Chappell
ATTY.

Patented Feb. 1, 1949

2,460,430

UNITED STATES PATENT OFFICE 2,460,430

INNER RING OR EXPANDER FOR PISTONS

Harold P. Phillips, Hastings, Mich., assignor to Hastings Manufacturing Company, Hastings, Mich.

Application April 26, 1944, Serial No. 532,770

2 Claims. (Cl. 309—43)

This invention relates to improvements in inner ring or expander for pistons.

The main objects of this invention are:

First, to provide an inner spring piston ring or expander ring which has the desired resilience and responsiveness and at the same time is very durable.

Second, to provide an expander spring for piston rings which has the advantages stated and may be economically produced.

Objects pertaining to details and economies of the invention will appear from the description to follow. The invention is defined in the claims.

Preferred embodiments of the invention are illustrated in the accompanying drawings, in which:

Fig. 1 is an enlarged fragmentary view of a piston and cooperating cylinder through the oil ring groove and oil ring therein showing the expander of my invention.

Fig. 2 is an enlarged fragmentary plan view of a piston ring expander embodying the features of my invention.

Fig. 3 is a perspective view of my improved expander or inner ring in a practical embodiment thereof.

Fig. 4 is a fragmentary section corresponding to that of Fig. 1 illustrating a modified form or embodiment of my invention.

Fig. 5 is an enlarged fragmentary plan view of the expander spring of the embodiment shown in Fig. 4.

Fig. 6 is a fragmentary section of another modification or adaptation of my invention.

Fig. 7 is a fragmentary perspective view of another modification or embodiment of my invention.

In the accompanying drawings I have made no attempt to show the parts in their proper relative proportions or to illustrate proper clearances between the piston and cylinder and between the piston ring element and the walls of the piston ring groove. Clearances and tolerances are understood by those skilled in the art. Further, I illustrate certain parts as chrome plated and it will be understood that I have not attempted to show the relative thickness of the plating.

In the accompanying drawing 1 represents the cylinder of an internal combustion engine and 2 a piston having a piston ring groove 3 therein, that illustrated being the oil ring groove which is provided with drain openings 4 to the crank case. The piston ring assembly illustrated comprises a pair of ribbon steel side members 5 spaced axially from each other by means of the spacer 6, preferably of cast iron having an annular cylinder contacting land 7 and drain openings 8. This generally is the ring illustrated in my Patent 2,148,997. It will be understood, however, that my improved expander spring is not only well adapted for use in a ring assembly of the type illustrated in Fig. 1 but is well adapted for use with compression rings such as the ring 9 illustrated in Fig. 6 where the ring groove 10 is not provided with drain openings. It may also be used with a scraper ring where expander springs are desired.

In the embodiment of the invention shown in Figs. 1, 2 and 3 my improved expander spring or inner ring, designated by the numeral 11, is of general polygonal shape provided with a plurality of outwardly bowed or convex crimps 12 adapted for supporting engagement with the piston ring associated therewith, the reaches 13 being adapted to engage the bottom of the piston ring groove. No attempt is made to illustrate this in the accompanying drawing as it is well understood in the art.

The expander ring 11 is formed of ribbon steel and split at 14, the reaches 13 being notched at 15 or provided with suitable drain openings. It will be appreciated that where the expander is to be used in connection with a compression ring such as 9 shown in Fig. 6, the drain openings are not required. The outwardly bowed crimps 12 have a chrome plating 16 applied thereto, which may extend entirely across the crimp, that is the full width of the expander spring as shown in Figs. 1, 2, 3 and 6, or it may be restricted to edge portions as shown at 17 in Figs. 4 and 5, particularly where the expander is to be used with ring assemblies such as shown in Figs. 1 and 4 where the side members only are supported by the expander.

This chrome plating is characterized by a pronounced crackle condition or crack pattern, the crack being conventionally indicated at 18. It will be understood that these cracks follow no regular pattern and the illustration thereof is more or less conventional in character. The cracked condition is highly desirable as with this chrome plating in pronounced crack pattern the flexibility of the crimps is not impaired, and they may be flexed without the plating fracturing or flaking off. The cracks of the crack pattern act to reduce compression and tension in the plating on the crimps of the expander spring, upon flexing of the crimps to thereby prevent scaling off of the plating and to maintain the resiliency of the spring steel. It will be understood that it is highly desirable that piston ring expanders be highly flexible and responsive or quick-acting, a feature which is not incident when relatively heavy ribbon steel stock is employed. The resilience of the ring without the chrome plating of pronounced crack pattern is greatly affected by a relatively slight amount of wear on the crimps, which is the point or zone of greatest wear, owing to the fact that it is the point where the greatest amount of frictional action takes place between the expander and the ring with which it is associated. The chrome plating of pronounced crack pattern on the outer surface of the crimps not only provides a hardened surface to resist wear but even though substantially worn the cracks in the plating facilitate a substantially uniform resiliency of the crimps while being so worn.

In the embodiment of my invention illustrated in Fig. 7, the entire expander spring is chrome plated to provide a wear resisting surface, this plating also being of the crack pattern type or in crackled condition which while preventing wear does not materially affect resilience.

Expanders embodying this invention retain their resilience and responsiveness for a long period of time, the chromium plating characterized by the pronounced crack condition or pattern serving to prevent wear but not materially affecting resilience and not materially flaking off in use.

I have not attempted to illustrate various adaptations and modifications which I contemplate as it is believed this disclosure will enable those skilled in the art to embody or adapt my invention as may be desired.

Having thus described my invention, what I claim as new and desire to secure by Letters Patent, is:

1. An expander spring for piston rings comprising a thin ribbon-like generally polygonal split strip of spring steel having a plurality of outwardly bowed ring engaging crimps and a plurality of connecting reaches therefor, the radius of curvature of said crimps being relatively small compared to that of the piston ring expanded by the expander spring, each of said crimps having chrome plating providing wear resisting ring engaging surfaces, such chrome plating being characterized by a pronounced crack pattern, the cracks of said pattern reducing compression and tension in the plating on the crimps upon flexing of the crimps to prevent scaling off of the plating and to maintain the resiliency of the spring steel.

2. An expander spring for use with a piston ring in a piston ring groove comprising a split steel element having a plurality of convex crimps for radial spring thrust engagement with a piston ring and connected by reaches adapted for supported engagement with the bottom of a piston ring groove, the radius of curvature of said crimps being relatively small compared to that of the piston ring expanded by the expander spring, the said crimps having wear resisting chrome plating characterized by a pronounced crack pattern, the cracks of the pattern reducing compression and tension in the plating upon flexing of the crimps and thereby permitting the flexing of the crimps without fracturing the plating.

HAROLD P. PHILLIPS.

REFERENCES CITED

The following references are of record in the file of this patent:

UNITED STATES PATENTS

| Number | Name | Date |
| --- | --- | --- |
| 1,956,014 | Fink | Apr. 24, 1934 |
| 2,113,857 | Phillips | Apr. 12, 1938 |

FOREIGN PATENTS

| Number | Country | Date |
| --- | --- | --- |
| 518,694 | Great Britain | Mar. 5, 1940 |

OTHER REFERENCES

"Recent developments in piston rings for high speed diesels"—"Diesel Power and Transportation," August, 1942, page 650. (Copy available in Div. 28.)